United States Patent
Han

(10) Patent No.: US 6,986,077 B2
(45) Date of Patent: Jan. 10, 2006

(54) ACCOUNTING APPARATUS AND METHOD FOR MOBILE COMMUNICATION SYSTEM

(75) Inventor: Seung-Wook Han, Seoul (KR)

(73) Assignee: Samsung Electronics Co., Ltd., (KR)

( * ) Notice: Subject to any disclaimer, the term of this patent is extended or adjusted under 35 U.S.C. 154(b) by 574 days.

(21) Appl. No.: 10/270,958

(22) Filed: Oct. 15, 2002

(65) Prior Publication Data

US 2003/0103518 A1 Jun. 5, 2003

(30) Foreign Application Priority Data

Oct. 15, 2001 (KR) ................. 2001-63509

(51) Int. Cl.
*G06F 11/00* (2006.01)

(52) U.S. Cl. ............... 714/4; 370/395.52; 370/395.21

(58) Field of Classification Search .............. 714/4; 370/395.21, 395.52; 379/112.01, 112.06, 379/114.03, 114.04, 121.04
See application file for complete search history.

(56) References Cited

U.S. PATENT DOCUMENTS

| | | | |
|---|---|---|---|
| 6,445,916 B1 * | 9/2002 | Rahman | 455/423 |
| 6,701,342 B1 * | 3/2004 | Bartz et al. | 709/200 |
| 6,728,208 B1 * | 4/2004 | Puuskari | 370/230.1 |
| 2002/0077981 A1 * | 6/2002 | Takatori et al. | 705/40 |
| 2005/0026592 A1 * | 2/2005 | Walter et al. | 455/406 |
| 2005/0091157 A1 * | 4/2005 | Suzuki et al. | 705/40 |

OTHER PUBLICATIONS

Morgan, Martin, "Will GPRS cost a packet?", Oct. 19, 1999, wirelessGeneva.com.*
Harter, Betsy, "Billing for Mobile Data", Spetember 1, 1999, Wireless Review.*
"Billing for Success in the Wireless IP Market", 2001, Cisco Systems, Inc.*

* cited by examiner

*Primary Examiner*—Bryce P. Bonzo
*Assistant Examiner*—Michael Maskulinski
(74) *Attorney, Agent, or Firm*—Dilworth & Barrese, LLP

(57) ABSTRACT

An accounting apparatus and method for a mobile communication system, where a packet service accounting method for a mobile communication terminal includes the steps of checking whether there is an error in a received PPP frame; if there is an erroneous PPP frame in the received PPP frame, generating a PPP control frame containing a size information of the erroneous PPP frame; transmitting the PPP control frame to a base station; and if an authorization response for the PPP control frame is received from the base station, updating a size of total received data, and displaying the updated data size on a display.

14 Claims, 4 Drawing Sheets

| 7E | FF | 03 | PROTOCOL | DATA | CRC | 7E |

FIG.2

| REQUEST/REPONSE | IDENTIFIER | LENGTH | TYPE | ERRONEOUS DATA QUANTITY | REAL RECEIVED DATA QUANTITY |

FIG.3

ACCOUNTING APPARATUS AND METHOD FOR MOBILE COMMUNICATION SYSTEM

PRIORITY

This application claims priority to an application entitled "ACCOUNTING APPARATUS AND METHOD FOR MOBILE COMMUNICATION SYSTEM", filed in the Korean Industrial Property Office on Oct. 15, 2001 and assigned Serial No. 2001-63509, the contents of which are hereby incorporated by reference.

BACKGROUND OF THE INVENTION

1. Field of the Invention

The present invention relates to an accounting apparatus and method for a mobile communication system, and more particularly to an apparatus and method for generating an invoice for data having no error in a mobile communication system.

2. Description of the Related Art

Generally, a CDMA (Code Division Multiple Access) mobile communication system has been developed from typical voice-centered mobile communication standards to the next generation mobile communication standards to make it possible to transmit not only voice signals but also high-speed radio data. This next generation mobile communication standard called IMT-2000 (International Mobile Telecommunication-2000) is now being developed to bring a new age of a high-speed radio data service. Presently, a CDMA2000-1x (IS-95C) system supports a radio data communication service at a data transmission speed of 144 kbps corresponding to a speed double that of an IS-95B system. In the future, assuming that a CDMA2000-3x system is developed, a user may receive a communication service at a maximum speed of 384 kbps. There are various kinds of the communication services, that is, a VOD (Video On Demand) service, a music video service, a TV broadcasting service, etc. A user may receive service data over a packet network instead of a circuit network. In this case, the user may have to pay a charge for a total of quantity communication data (i.e., the number of packets) not total communication use time. Therefore, service providers have to provide the user with an accurate explanation of the charges by accurately indicating on their bill the quantity of communication data.

Presently, SK telecom Co., Ltd. and Korea Telecom Freetel Co., Ltd., which are representative service providers in the Republic of Korea, adopt a monthly fixed rate in their accounting system, and charge their subscribers a fee in excess of the monthly fixed rate based on a predetermined time zone such as a common time zone, a discount time zone, and a midnight time zone, as shown in the following TABLE 1.

As shown in the above TABLE 1, SK telecom Co., Ltd. and Korea Telecom Freetel Co., Ltd. charge their subscribers (i.e., users) a usage fee on the basis of the communication time irrespective of the used data quantity. As seen from the table, they have a scale of charges dependent only on the time zones such as common, discount, and midnight time zones. However, in recent times, they have announced a new accounting plan by which a usage fee for the next generation mobile communication system (e.g., 2G or CDMA2000-1x) is dependent on the quantity of data for various types of Internet content used, as shown in the following TABLE 2.

TABLE 2

| Contents Type | Rate Base (1 packet = 512 bytes) |
| --- | --- |
| E-mail (Text) | 6.5 won/packet |
| Character Download | 6.5 won/packet |
| Norahbang (Karaoke) | 2.5 won/packet |
| MP3 | 2.5 won/packet |
| Download Game | 2.5 won/packet |
| VOD | 2.5 won/packet |

As shown in the above TABLE 2, subscribers are unchanged usage fees based on the quantity of the received data for each of Internet Contents. For example, the usage fee of 6.5 won per packet is applicable to the E-mail service, and another usage fee of 2.5 won per packet is applicable to the VOD service.

However, the above-mentioned accounting methods have a disadvantage in that data loss caused by a poor channel condition very frequently occurs while using a network such as the Internet. Accordingly, the user has to pay his or her usage fee even when poor data is received or data is lost from Internet Contents over the network such as the Internet.

Typically, in the case where a packet service is transmitted to a mobile communication terminal, data loss occurs in a PPP (Point-to-Point Protocol) layer, and further, more serious data loss occurs while the mobile communication terminal is moving. In this case, after the lost data is discarded, a data re-transmission procedure is performed in a TCP (Transmission Control Protocol) layer. However, according to the conventional accounting method, the service providers have undesirably charged their users for the lost data. In other words, the conventional accounting method has a disadvantage in that too much money is unfairly charged to the users when a large amount of data loss occurs due to a poor channel condition.

In the case where the user receives undesired data instead of his or her desired data over the network, the user must pay a usage fee for the undesired data to a corresponding service provider although there is no data loss in a data transmission procedure. In more detail, in the case where unnecessary

TABLE 1

| Classification | Monthly Fixed Rate | Free Communication Time | Over Free Communication Time (Won per 10 seconds) | | |
| --- | --- | --- | --- | --- | --- |
| | | | Common Time Zone | Discount Time Zone | Midnight Time Zone |
| Data Standard | — | — | | | |
| Data 60 | 2700 won | 60 minutes (20 minutes/10 minutes/30 minutes) | 17 won | 12 won | 8 won |
| Data 120 | 4500 won | 120 minutes (50 minutes/20 minutes/50 minutes) | 17 won | 12 won | 8 won |
| Data 240 | 8500 won | 240 minutes (100 minutes/40 minutes/100 minutes) | 17 won | 12 won | 8 won | data instead of necessary data to be received from a TCP/ UDP (Transmission Control Protocol/User Datagram Protocol) service port number is transmitted to a user's terminal while the user uses an application program, it is desirable that a usage fee for the unnecessary data is not charged to the user. But, actually, the user must pay the service provider usage fee for the unnecessary data. Also, in case of an UDP, where unnecessary data is successively received from a server because a user's terminal is not released from the server after completing a user's application program, the user must again pay an excessive fee for the unnecessary data.

SUMMARY OF THE INVENTION

Therefore, the present invention has been made in view of the above problems, and it is an object of the present invention to provide an accounting apparatus and method for generating a clear user invoice in a packet service of a mobile communication system.

It is another object of the present invention to provide an accounting apparatus and method for performing accurate accounting action in a packet service of a mobile communication system.

It is yet another object of the present invention to provide an accounting apparatus and method for excluding from a user fee an excessive fee caused by erroneous data in a packet service of a mobile communication system.

In accordance with one aspect of the present invention, the above and other objects can be accomplished by providing a packet service accounting apparatus for a mobile communication terminal, comprising: a PPP (Point-to-Point Protocol) layer for checking whether there is an error in a received PPP frame, and generating a PPP control frame containing size information of an erroneous PPP frame when there is an erroneous PPP frame in the received PPP frame; and a physical layer for loading the PPP control frame on a physical channel frame, and transmitting it to a base station.

In accordance with another aspect of the present invention, there is provided a packet service accounting method for a mobile communication terminal, comprising the steps of a) checking whether there is an error in a received PPP frame; b) if there is an erroneous PPP frame in the received PPP frame, generating a PPP control frame containing size information of the erroneous PPP frame; c) transmitting the PPP control frame to a base station; and d) if an authorization response for the PPP control frame is received from the base station, updating a size of total received data, and displaying the updated data size on a display.

BRIEF DESCRIPTION OF THE DRAWINGS

The above and other objects, features and other advantages of the present invention will be more clearly understood from the following detailed description taken in conjunction with the accompanying drawings, in which:

FIG. 2 is an illustration depicting a configuration of a PPP (Point-to-Point Protocol) frame in accordance with a preferred embodiment of the present invention;

FIG. 3 is an illustration depicting a configuration of a "Data" field of the PPP frame of FIG. 3 in accordance with a preferred embodiment of the present invention;

DETAILED DESCRIPTION OF THE PREFERRED EMBODIMENTS

Figure 1:
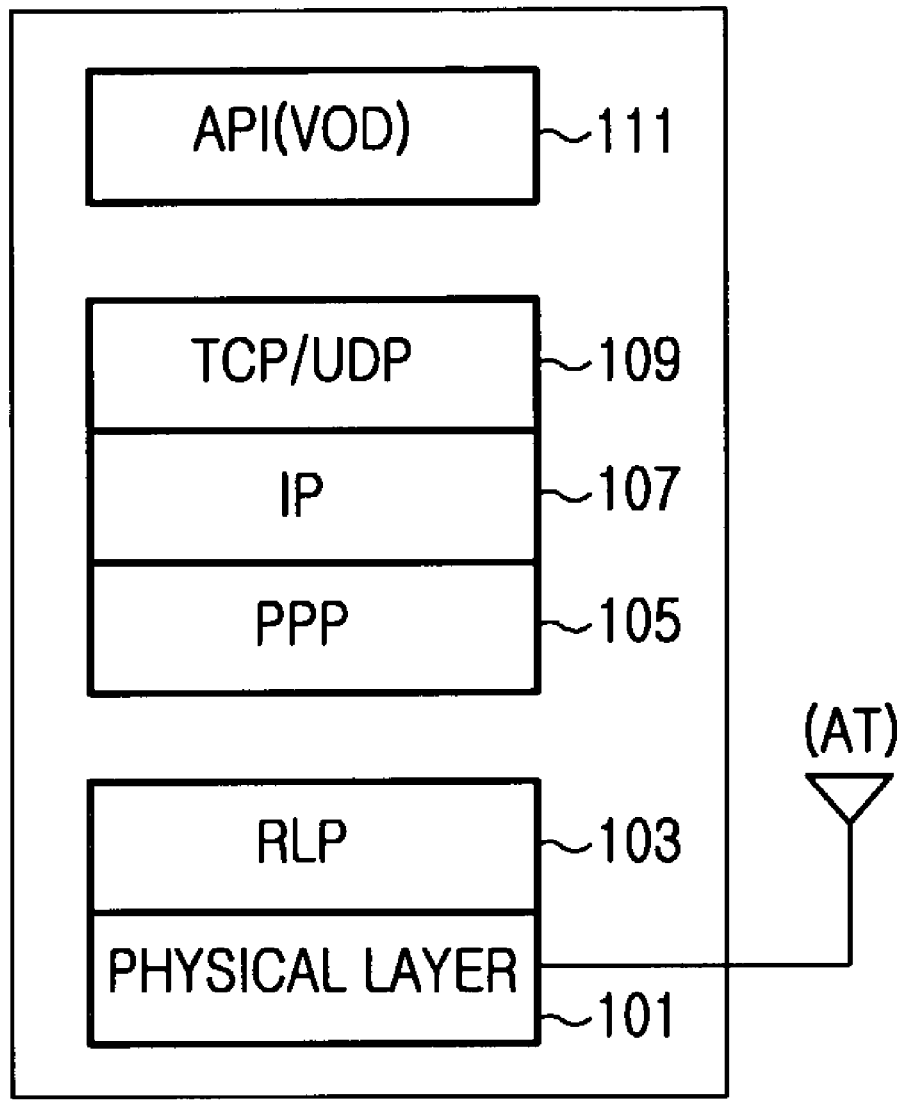
FIG. 1 is an illustration of a protocol layer configuration in association with a packet service in a mobile communication terminal in accordance with a preferred embodiment of the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted as it may cloud the subject matter of the present invention.

The present invention is provided to charge a user an accurate usage fee in a packet service of a mobile communication system where channel conditions are abruptly variable. For this purpose, a mobile communication terminal measures a quantity of received data having no error and a quantity of accurate received data, and displays them. In this case, the mobile communication terminal informs a base station of a quantity of erroneous received data and a quantity of unnecessary received data, and thus enables the base station to exclude the quantities of erroneous and unnecessary received data from a total account. As a result, the user may recognize accurately a quantity of received data, and may pay his or her usage fee for a quantity of actually serviced data.

FIG. 1 is a view showing a protocol layer configuration in association with a packet service in a mobile communication terminal in accordance with a preferred embodiment of the present invention.

As shown in FIG. 1, a protocol layer includes a physical layer 101 and an RLP (Radio Link Protocol) layer 103 that are used for radio access; a PPP layer 105, an IP (Internet Protocol) layer 107 and a TCP/UDP layer 109 that are used for a radio packet service; and an application (API: Application Programming Interface) 111 for supporting an E-mail service and a VOD (Video On Demand) service, etc. A procedure for allowing a mobile communication terminal to receive packet data will hereinafter be described with reference to FIG. 1.

Referring to FIG. 1, the physical layer 101 decodes a physical layer frame received wirelessly and checks a CRC (Cyclic Redundancy Check) of the decoded physical layer frame. If there is no error in the CRC, the physical layer 101 transmits a payload of the frame to an upper RLP layer 103. Herein, the physical layer is implemented with hardware (e.g., a channel encoder, etc.) corresponding to a physical channel such as a supplemental channel. The RLP layer 103 generates PPP frames using RLP frames received from the physical layer 101, and transmits them to the PPP layer 105.

The PPP layer 105 is a data link layer between two points, a MS (Mobile Station) and PDSN (Packet Data Serving Node), and is used for an IP addressing and Registration/authentication. According to the present invention, the PPP layer 105 detects a quantity of data to be excluded from a total account, and sends a message to a base station informing it of the quantity of data to be excluded. For example, in the case where a PPP layer 105 detects erroneous data (i.e., erroneous frame) by checking the CRCs of the PPP frames received from the RLP layer 103, it generates a PPP control frame containing information of a size of the erroneous frame and transmits it to the base station. For another example, in the case where upper protocol layers inform the PPP layer 105 of unnecessary data reception, the PPP layer 105 generates a PPP control frame containing information of a size of the unnecessary data, and then transmits it to a base station.

The IP layer 107 functioning as a data transmission path is a network layer. According to the present invention, the IP layer 107 investigates data received from the PPP layer 105.

Upon receiving the investigation result, in the case where the received data is an UDP data and a port number is a predetermined value (e.g., 434), the IP layer 107 transmits the received data to a TCP/UDP layer 109. In the case where the port number is not the predetermined value, the IP layer 107 informs the PPP layer 105 of unnecessary data reception. At this time, the IP layer 107 also informs the PPP layer 105 of a size of the unnecessary data.

The TCP/UDP layer 109 having an error recovery function is a transport layer for reliable data transmission. According to the present invention, in the case where the TCP/JDP layer 109 is not released from a server after an upper application 111 has been completed and thereby receives unnecessary data from the server, it informs the PPP layer 105 of the unnecessary data reception. At this time, the TCP/UDP layer 109 also informs the PPP layer 105 of the size of the unnecessary data. The application 111 corresponds to a driving part for receiving a VOD service, music video service, or TV broadcasting service.

A starting point of a packet data is on the PPP layer 105. The PPP layer 105 has a part for detecting errors of the received frame data. If the part receives the erroneous frame data, then it sends a message of a size of the erroneous frame data to a base station. Also, if the part detects that the PPP layer receives unnecessary data, then it sends a message of a size of the unnecessary data.

Operations of the present invention will hereinafter be described with reference to the accompanying drawings.

Figure 4:
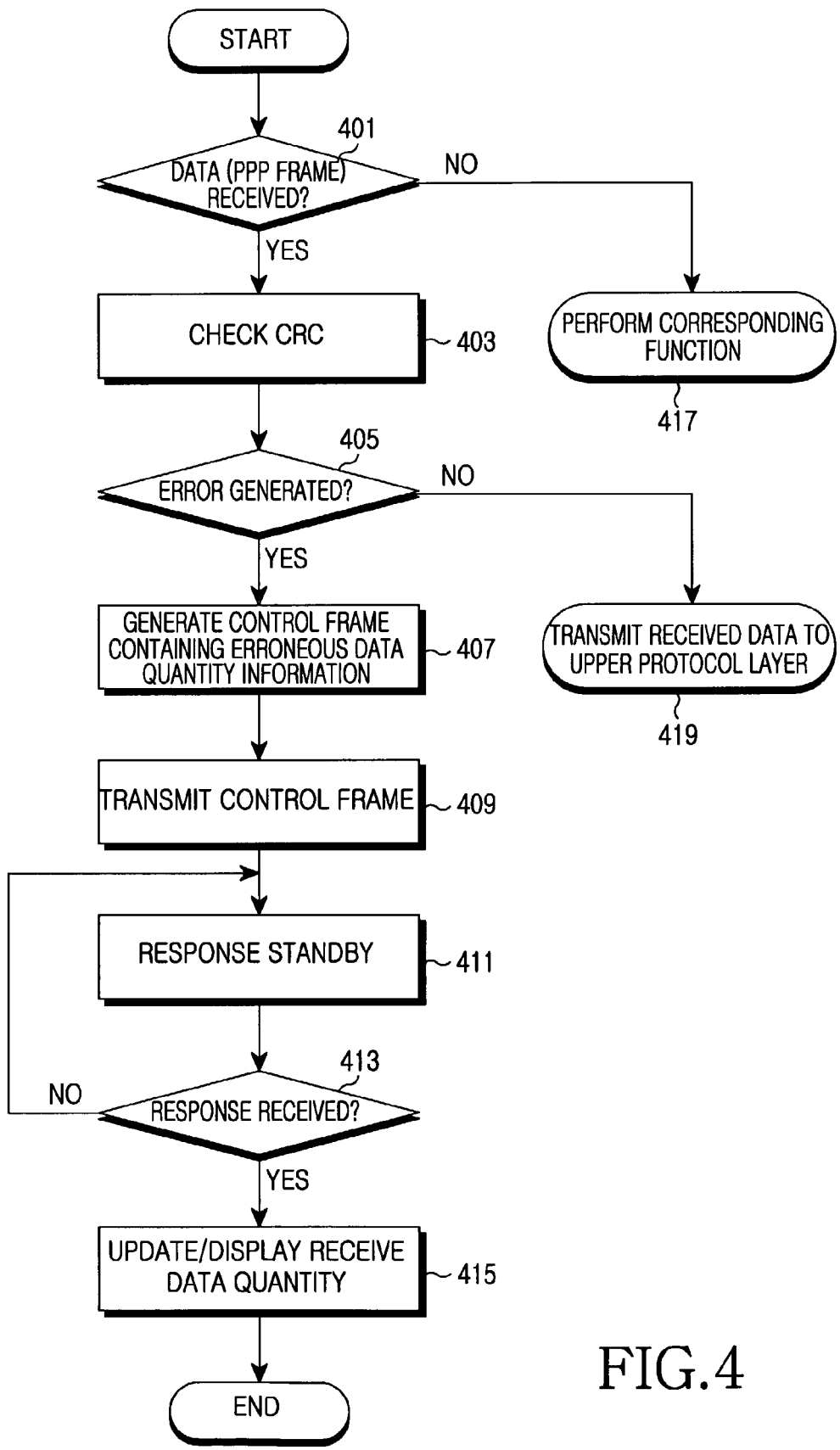
FIG. 4 is a flow chart illustrating a procedure for preventing erroneous data from being charged in a mobile communication terminal in accordance with a preferred embodiment of the present invention.

FIG. 4 is a flow chart illustrating a procedure for preventing erroneous data from being charged in a mobile communication terminal in accordance with a preferred embodiment of the present invention.

With reference to FIG. 4, it is determined at step 401 that a PPP layer 105 receives a frame from an RLP layer 103. In the case where the PPP layer 105 receives the frame from the RLP layer 105 at step 401, it calculates a CRC about the received frame and compares the CRC with a predetermined CRC included in the frame at step 403. In the case where the PPP layer 105 does not receive the frame from the RLP layer 105 at step 401, a procedure goes to step 417 to perform a corresponding function. Then, upon receiving the CRC comparison result from step 403, the PPP layer 105 determines at step 405 whether there is an error in the frame. If there is an error in the frame (i.e., erroneous frame), then the PPP layer 105 goes to step 407 to generate a control frame containing the information of the erroneous data size (i.e., the size of the erroneous frame). Herein, for example, a PPP frame is used as the control frame. A configuration of the PPP frame is shown in FIG. 2. There are many fields in the PPP frame, and each field is defined as follows, as shown in FIG. 2.

A field "7E" having 1 byte indicates a start and termination points of frame. A field "Address" having 1 byte indicates a device address between peers. A field "Control" having 1 byte performs a frame flow control between peers. A field "FF" having 1 byte indicates "Address" and "03" indicates "Control". A field "CRC" having 2 bytes is adapted to detect an error of frame. A field "Protocol" having 2 bytes determines a type of frame, e.g., a PPP control data or a real IP data frame, etc. If the field "Protocol" is 0x0021, it means an IP packet. A field "Data" having 1 1500 bytes contains data contents used for a protocol.

In order to inform a base station of the size of the erroneous data, data contents recorded in the field "Data" of FIG. 2 are classified into an "Identifier", a "Request/Response", a "Length", a "Type", an "Erroneous data quantity", and a "Real received data quantity", as shown in FIG. 3. A configuration of the "Data" field of the PPP frame of FIG. 3 is as follows.

The field "Request/Response" having 1 byte allows a terminal to send a message "1" to a base station as an error request signal, and then allows the base station to send a message "2" to the terminal as a request response signal. In this case, the base station uses an identifier received from the terminal.

The field "Identifier" having 1 byte indicates the number of transmitted data. Whenever the error occurs, the field "Identifier" increases a request value one by one. Here, the range of the request value is from 1 to 255, and thus the request value circulates from 1 to 255.

The field "Length" having 2 bytes calculates the number of bytes between the field "Request/Response" to the field "Real received data quantity". In FIG. 3, the "data" field is 13 bytes because 1 byte (Request/Response)+1 byte (Identifier)+2 bytes (Length)+1 byte (Type)+4 bytes (Erroneous data quantity)+4 bytes (Real received data quantity)=13 bytes.

The field "Type" having 1 byte indicates that a PPP frame content is a measurement value corresponding to the quantity of data received at a terminal.

The field "Erroneous data quantity" having 4 bytes indicates a size of the erroneous frame. The field "Real data quantity" having 4 bytes indicates a size of data having no error.

As described above, since a configuration of a frame adapted to inform a base station of a size of the erroneous data is equal to that of a PPP control data frame, it can be readily applicable to the PPP control data frame. As compared to the PPP control data frame, the frame of FIG. 3 newly defines the field "Type" in such a way that the base station recognizes the erroneous data quantity and the real received data quantity. Presently, the field "Type" is commonly determined within the range of 0x01 0x0f, values outside the range of 0x01 0x0f are not used. Therefore, the present invention defines the field "Type" used for informing the size of erroneous data as a "0x06". In the case where a base station does not respond to a PPP frame containing the size information of the transmitted erroneous data, a terminal retransmits the PPP frame, for example, every one second. Likewise, even when unnecessary data is received at the terminal, the terminal transmits a PPP control frame to a base station. However, provided that the base station has no function to process the PPP control frame, it responds to a terminal's request with a rejection response "3" being a basic PPP operation.

Returning again to FIG. 3, the PPP layer 105 transmits at step 409 the control frame (i.e., a PPP control frame containing the size information of erroneous data) generated to a base station. The PPP frame is mapping-processed with an RLP frame in an RLP layer 103. The RLP frame is loaded on a physical channel frame in the physical layer 101 and is then transmitted to the base station. Thereafter, the PPP layer 105 determines at step 413 whether the base station responds to the PPP control frame. In the case where the base station responds to the PPP control frame at step 413, the PPP layer 105 goes to step 415. In the case where the base station does not respond to the PPP control frame at step 413, the PPP layer 105 returns to step 411 to wait for a response of the base station. In the case where the PPP layer 105 does not receive the base station's response within a predetermined answerable time, it retransmits the PPP control frame generated at step 407, for example, every one second.

In the case where the PPP layer 105 receives the base station's response to the PPP control frame, it updates a quantity of received data and then displays it on a display of a terminal at step 415. Basically, the terminal continuously displays its own received data quantity on its own display while receiving a packet service. In this case, the terminal includes erroneous data in total received data under the condition that there is no authorization of the base station. However, in the case where the terminal transmits a request signal for excluding a quantity of the erroneous data from total data used for a user fee to the base station and then receives a response to the request signal from the base station, it subtracts the quantity of erroneous data from the total data and displays the result signal on its own display. As a result, the user can readily recognize the accurate quantity of data actually received at his or her terminal, and a system excludes an excessive fee caused by the erroneous data from a user fee in such a way that more accurate accounting is performed in a packet service.

The aforementioned preferred embodiment related to a PPP frame in error informs a base station of the erroneous PPP frame in such a way that excessive fees caused by the erroneous PPP frame are subtracted from a total user fee. For another preferred embodiment, the present invention describes a method for excluding an excessive fee caused by unnecessary data from a total user fee. For example, the unnecessary data may be data other than data of a port number of a TCP/UDP layer 109's service, or undesired data received after the elapsing of a user's application in a UDP service.

Figure 5:
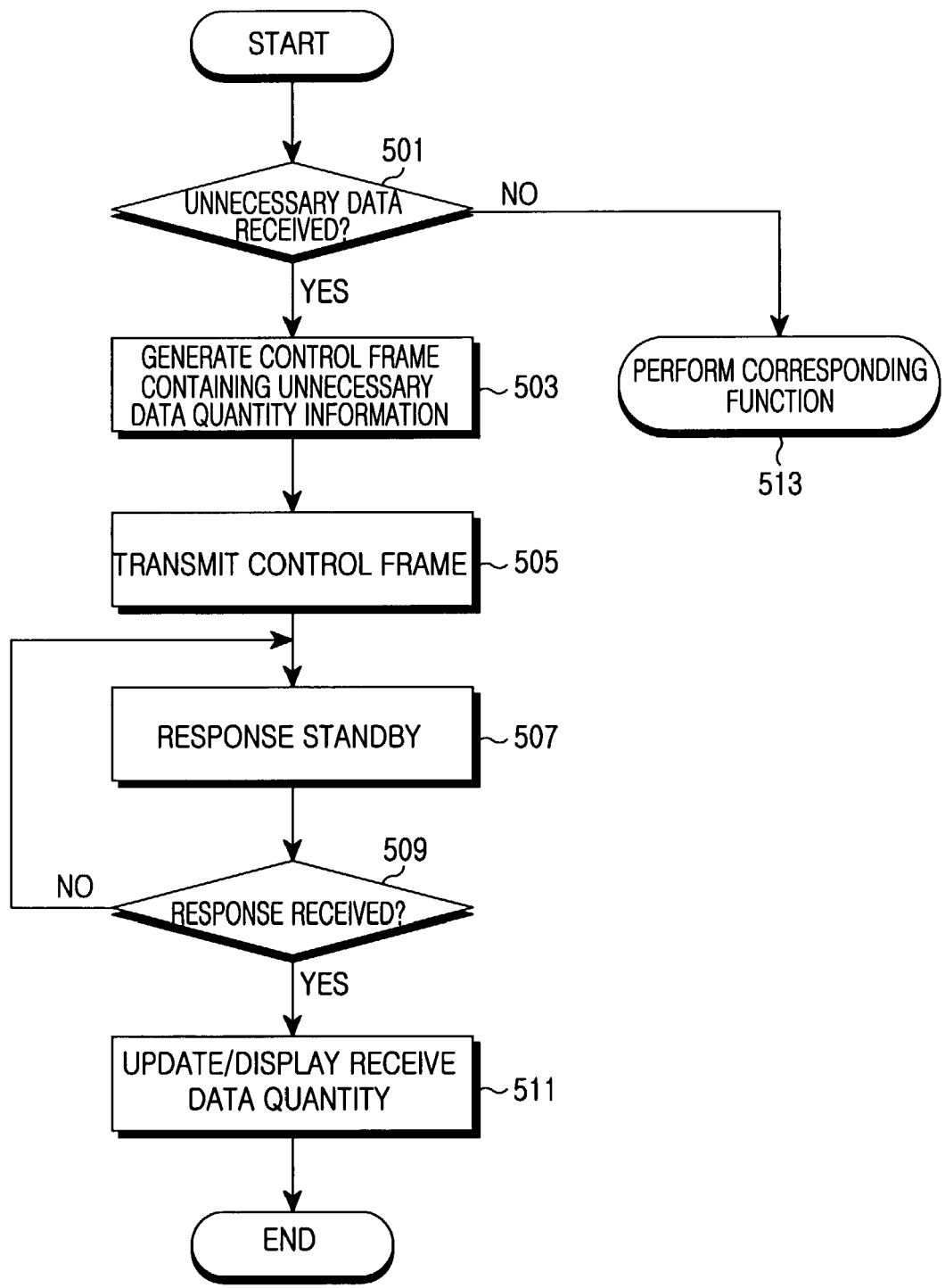
FIG. 5 is a flow chart illustrating a procedure for preventing charges associated with unnecessary data from being charged in a mobile communication terminal in accordance with a preferred embodiment of the present invention.

FIG. 5 is a flow chart illustrating a procedure for preventing unnecessary data from being charged in a mobile communication terminal in accordance with a preferred embodiment of the present invention.

With reference to FIG. 5, it is determined at step 501 whether a PPP layer 105 receives unnecessary data or not. For example, in case of a terminal driving a mobile IP application only, an IP layer 107 investigates data received from the PPP layer 105. Upon receiving the investigation result, the IP layer 107 transmits the received data to an upper protocol layer when the received data is a UDP data and a port number is 434. But, unless the received data is the UDP data and the port number of 434, the IP layer 107 considers the received data as unnecessary data and informs the PPP layer 105 of unnecessary data reception. For another example, in the case where the TCP/UDP layer 109 is not released from a server after an upper application 111 (e.g., a VOD service) has been completed and thereby receives data from the server, it considers the data as unnecessary data and informs the PPP layer 105 of it. In the case where the PPP layer 105 receives unnecessary data at step 501, a procedure goes to step 503. In the case where the PPP layer 105 does not receive unnecessary data at step 501, a procedure goes to step 513 to perform a corresponding function.

If the PPP layer 105 receives the unnecessary data at step 501, then the PPP layer 105 goes to step 503 to generate a control frame (i.e., a PPP control frame) containing the information of the unnecessary data size (i.e., the frame's size). Herein, the control frame is a PPP frame based on FIGS. 2 and 3. Meanwhile, the PPP layer 105 transmits to a base station at step 505 the control frame (i.e., a PPP control frame containing the size information of unnecessary data) generated. The PPP frame is mapping-processed with an RLP frame in an RLP layer 103, and the RLP frame is loaded on a physical channel frame in the physical layer 101 and then transmitted to the base station.

Thereafter, the PPP layer 105 determines at step 509 whether the base station responds to the control frame. In the case where the base station responds to the control frame at step 509, the PPP layer 105 goes to step 511. In the case where the base station does not respond to the control frame at step 509, the PPP layer 105 returns to step 507 to wait for a response of the base station. In the case where the PPP layer 105 does not receive the base station's response within a predetermined answerable time, it retransmits the control frame generated at step 503, for example, every one second. In the case where the PPP layer 105 receives the base station's response to the control frame at step 509, it updates a quantity of received data and then displays it on a display of a terminal at step 511 As a result, the base station can perform more accurate accounting with the accurate quantity of data received at the terminal.

As apparent from the above description, a user can readily recognize the quantity of accurate data actually received at his or her terminal while using a packet service. Further, a terminal informs a base station of the quantity of erroneous data and the quantity of unnecessary data in such a way that a system performs more accurate accounting action about the user's terminal. In conclusion, the present invention generates a clear user invoice in a packet service of a mobile communication system, and the user pays a usage fee for only the quantity of data actually received at his or her terminal.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A packet service accounting apparatus for a mobile communication terminal, said packet service accounting apparatus being adapted to have a protocol layer configuration, characterized in that said protocol layer configuration is comprised of:
   a Point-to-Point Protocol (PPP) layer configured to check whether there is an error in a received PPP frame, and generate a PPP control frame containing a size information of erroneous data when there is erroneous data in the received PPP frame ; and
   a physical layer for loading the PPP control frame on a physical channel frame, and transmitting the PPP control frame to a base station.

2. The apparatus as set forth in claim 1, wherein the PPP control frame further includes size information of data having no error.

3. The apparatus as set forth in claim 1, further comprising:
   a TCP/UDP (Transmission Control Protocol/User Datagram Protocol) layer for checking data received from the PPP layer, extracting a port number of UDP and TCP service upon receiving the checking result, determining the received data as erroneous data when the port number is different from a predetermined number, and informing the PPP layer of a size information of the erroneous data, wherein the PPP layer generates the PPP control frame containing the size information of the erroneous data when receiving the size information of the erroneous data from the TCP/UDP layer.

4. The apparatus as set forth in claim 3, wherein if the TCP/UDP layer is not released from a server after an upper application has been completed and thereby receives data from the server, the TCP/UDP layer determines the data as erroneous data and then informs the PPP layer of a size information of the erroneous data.

5. The apparatus as set forth in claim 1, further comprising:
   a upper controller for updating a size of received data when an authorization response for the PPP control frame is received from the base station, and displaying the updated data size on a display.

6. The apparatus as set forth in claim 1, wherein the PPP layer uses a CRC (Cyclic Redundancy Check) while checking an error of the PPP frame.

7. A packet service accounting method for a mobile communication terminal, comprising the steps of:
   a) checking whether there is an error in a received PPP frame;
   b) if there is erroneous data in the received PPP frame, generating a PPP control frame containing a size information of the erroneous data;
   c) transmitting the PPP control frame to a base station; and
   d) if an authorization response for the PPP control frame is received from the base station, updating a size of total received data.

8. The method as set forth in claim 7, wherein the base station excludes an excessive fee corresponding to the size information of erroneous data contained in the PPP control frame from a user fee.

9. The method as set forth in claim 7, wherein step (a) uses a CRC (Cyclic Redundancy Check) when checking an error of the received PPP frame.

10. The method of claim 7, wherein step d) further comprises the step of displaying the updated data size received from the base station on a display.

11. A packet service accounting method for a mobile communication terminal, comprising the steps of:
   a) checking a port number of a TCP/UDP service of received data, and determining whether the port number is equal to a predetermined number;
   b) if the port number is different from the predetermined number, determining that the received data is erroneous data, and generating a PPP control frame containing a size information of the erroneous data;
   c) transmitting the PPP control frame to a base station; and
   d) if an authorization response for the PPP control frame is received from the base station, updating a size of total received data.

12. The method of claim 11, wherein step d) further comprises the step of displaying the updated data size received from the base station on a display.

13. A packet service accounting method for a mobile communication terminal, comprising the steps of:
   a) if a UDP data is received because a terminal is not released from a server after an upper application has been completed, determining that the UDP data is erroneous data, and generating a PPP control frame containing a size information of the erroneous data;
   b) transmitting the PPP control frame to a base station; and
   c) if an authorization response for the PPP control frame is received from the base station, updating a size of total received data.

14. The method of claim 13, wherein step c) further comprises the step of displaying the updated data size received from the base station on a display.

* * * * *